(12) United States Patent
Yoshii et al.

(10) Patent No.: US 8,007,585 B2
(45) Date of Patent: Aug. 30, 2011

(54) SYRUP COMPOSITION, RESIN MORTAR COMPOSITION AND METHOD OF COATING

(75) Inventors: Yujiro Yoshii, Toyohashi (JP);
Toshikazu Aoki, Owariasahi (JP); Mikio Takasu, Hekinan (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 833 days.

(21) Appl. No.: 12/067,419

(22) PCT Filed: Sep. 13, 2006

(86) PCT No.: PCT/JP2006/318179
§ 371 (c)(1),
(2), (4) Date: Mar. 19, 2008

(87) PCT Pub. No.: WO2007/034720
PCT Pub. Date: Mar. 29, 2007

(65) Prior Publication Data
US 2009/0047437 A1    Feb. 19, 2009

(30) Foreign Application Priority Data

Sep. 21, 2005 (JP) .................... 2005-273740
Jan. 26, 2006 (JP) .................... 2006-017332
Aug. 17, 2006 (JP) .................... 2006-222385

(51) Int. Cl.
*C04B 26/06* (2006.01)

(52) U.S. Cl. ........ 106/802; 106/660; 524/789; 524/847; 524/849; 524/850; 524/853; 524/854; 526/320; 526/321; 526/323.1; 526/323.2; 526/325

(58) Field of Classification Search ................ None
See application file for complete search history.

(56) References Cited

FOREIGN PATENT DOCUMENTS

| | | |
|---|---|---|
| JP | 5 78545 | 3/1993 |
| JP | 8 103490 | 4/1996 |
| JP | 8 283357 | 10/1996 |
| JP | 2000 154297 | 6/2000 |
| JP | 2001-164152 | 6/2001 |
| JP | 2001 240632 | 9/2001 |
| JP | 2002-220553 | 8/2002 |
| JP | 2002 234921 | 8/2002 |
| JP | 2003 253076 | 9/2003 |
| JP | 2004 203949 | 7/2004 |
| JP | 2004 323860 | 11/2004 |
| JP | 4285848 B2 | 6/2009 |

OTHER PUBLICATIONS

Machine-generated translation of JP 5-78545 (1993).*
Machine-generated translation of JP 2000-154297 (2000).*

* cited by examiner

*Primary Examiner* — Marc S Zimmer
(74) *Attorney, Agent, or Firm* — Oblon, Spivak, McClelland, Maier & Neustadt, L.L.P.

(57) ABSTRACT

A syrup composition of the present invention comprises a mixture of monomers (A), each having a molecular mass of 130 to 300 and one (meth)acryloyl group; a resin (C) which is soluble in the monomers (A) and has a glass transition temperature of 20 to 155° C.; a wax (D); and a tertiary amine (E), wherein the monomers (A) contain a heterocyclic ring-containing (meth)acrylate (a1), an oligoethylene glycol monoalkyl ether (meth)acrylate (a2), and a hydroxyalkyl (meth)acrylate (a3) having a hydroxyalkyl group with 2 or 3 carbon atoms. The syrup composition does not substantially contain a polyvalent metal soap.

8 Claims, No Drawings

US 8,007,585 B2

SYRUP COMPOSITION, RESIN MORTAR COMPOSITION AND METHOD OF COATING

TECHNICAL FIELD

The present invention relates to a syrup composition, a resin mortar composition, and a method of coating a floor surface, a wall surface, or a pavement surface of a road, or the like by using them.

The present application claims the priorities of Japanese Patent Application No. 2005-273740 filed on Sep. 21, 2005, Japanese Patent Application No. 2006-017332 filed on Jan. 26, 2006, and Japanese Patent Application No. 2006-222385 filed on Aug. 17, 2006, the contents of which are incorporated herein by reference.

BACKGROUND ART

An unsaturated polyester resin, an epoxy resin, or a polyurethane resin has been conventionally used for coating of floor surfaces, wall surfaces, pavement surfaces of roads, and the like. However, the unsaturated polyester resin is not so good in weather resistance, causes large contraction at the time of curing, and is insufficient in workability at a low temperature, though it is excellent in solvent resistance. The epoxy resin is not good in weather resistance, takes long time in curing, and is not so good in curability at a low temperature, though it is excellent in alkali resistance and adherence to a substrate. The polyurethane resin is not so good in chemical resistance and weather resistance, though it is excellent in elasticity and flexibility.

Consequently, a vinyl ester resin or an acrylic resin which is excellent in curability at a low temperature, weather resistance, and chemical resistance has been used in recent years. However, the vinyl ester resin and the acrylic resin have a problem of odor at the time of operation because they have peculiar odor originated from a low molecular mass monomer such as styrene or methyl methacrylate.

In recent years, people have been getting more concerned about environmental problems, and use of a material containing a volatile and highly odor-producing component such as an organic solvent or a low molecular mass monomer tends to be limited. Consequently, a syrup composition with low odor obtained by using a monomer having a high molecular mass or a monomer having a high boiling point has been proposed.

(1) An acrylic syrup composition containing a (meth)acrylate monomer which contains at least a heterocyclic ring-containing (meth)acrylate monomer, at least one of a polymer and a radical polymerizable oligomer, and a crosslinking agent (Patent Document 1).

(2) An acrylic syrup composition containing a (meth)acrylate monomer having a boiling point of 75° C. or higher at 6.67 kPa, a polymer or a radical polymerizable oligomer, and a wax in a state of dispersion (Patent Document 2).

(3) A resin composition containing a resin having a (meth)acryloyl group at the end of a molecule, an air-drying endowing type polymer obtained by using at least one of a drying oil and its aliphatic acid compound, and an ethylenically unsaturated monomer having a (meth)acryloyl group with a molecular mass of 160 or more (Patent Document 3).

(4) A resin composition containing a resin having a polymerizable unsaturated group, an acrylic monomer having a phenyl group and a molecular mass of 180 to 500, and a hydroxyalkyl (meth)acrylate having an alkyl group with 1 to 4 carbon atoms (Patent Document 4).

(5) A resin composition containing a polyether acrylic urethane resin having a (meth)acryloyl group at the end of a molecule, an unsaturated polyester resin using a drying oil as an alcoholysis compound, an air-drying endowing type polymer selected from an unsaturated polyester resin or an alkyd resin which is obtained by using at least one of a drying oil and its aliphatic acid compound, and an ethylenically unsaturated monomer having a (meth)acryloyl group with a molecular mass of 160 or more (Patent Document 5).

(6) A curable resin composition containing an epoxy (meth)acrylate comprising a reaction product of a (meth)acrylic acid and an epoxy compound obtained by reacting 1.5 to 3.5 moles of an aliphatic diglycidylether type epoxy compound having an epoxy equivalent of 300 or less with 1.0 mole of at least one of bisphenol A and bisphenol F, and a polymerizable (meth)acrylic monomer having a molecular mass of 160 or more and a viscosity of 100 mPa·s or less at 25° C. (Patent Document 6).

However, every syrup composition of (1) to (6) has a problem that curability at a portion contacting to air (surface curability) is lowered because a monomer with low reactivity is used. Consequently, it is necessary to use a polyvalent metal soap as a curing accelerator to improve the surface curability. However, there is a problem that finished appearance is affected by the polyvalent metal soap because the polyvalent metal soap forms a complex in the course of polymerization of a monomer to cause coloring in the coating film to be obtained.

Patent Document 1: Japanese Patent Application Laid-Open No. 2000-154297
Patent Document 2: Japanese Patent Application Laid-Open No. 2002-234921
Patent Document 3: Japanese Patent Application Laid-Open No. 8-283357
Patent Document 4: Japanese Patent Application Laid-Open No. 2004-203949
Patent Document 5: Japanese Patent Application Laid-Open No. 2004-323860
Patent Document 6: Japanese Patent Application Laid-Open No. 2001-240632

DISCLOSURE OF INVENTION

Problem to be Solved by the Invention

An object of the present invention is to provide a syrup composition and a resin mortar composition which have low odor and can form a coating film that is excellent in surface curability and that has little coloring. Another object of the present invention is to provide a method of coating a floor surface, a wall surface, a pavement surface of a road, or the like, which does not have a problem of odor at the time of operation.

Means for Solving the Problem

A syrup composition of the present invention comprises a mixture of monomers (A), each having a molecular mass of 130 to 300 and one (meth)acryloyl group; a resin (C) which is soluble in the monomers (A) and has a glass transition temperature of 20 to 155° C.; a wax (D); and a tertiary amine (E), in which the monomers (A) comprise a heterocyclic ring-containing (meth)acrylate (a1), an oligoethylene glycol monoalkyl ether (meth)acrylate (a2), and a hydroxyalkyl (meth)acrylate (a3) having a hydroxyalkyl group with 2 or 3 carbon atoms.

In the syrup composition of the present invention, a YI value of a cured material may be less than 20 when the syrup composition is applied so that the thickness of a coating film made of the syrup composition is 1 mm and the coating film is cured to be the cured material.

The syrup composition of the present invention may not substantially comprise a polyvalent metal soap.

In the syrup composition of the present invention, the monomers (A) may further comprise an alkyl (meth)acrylate (a4) having a long-chain alkyl group with 4 to 15 carbon atoms.

The syrup composition of the present invention may further comprise a monomer (B) having two or more (meth)acryloyl groups.

A resin mortar composition of the present invention comprises the syrup composition of the present invention, and an aggregate to be compounded with the syrup composition.

A method of coating of the present invention comprises applying the syrup composition of the present invention or the resin mortar composition of the present invention to an application surface to form a coating film.

A method of coating of the present invention comprises the steps of: forming a prime coating layer by coating the syrup composition of the present invention on an application surface; forming an intercoating layer by coating the resin mortar composition of the present invention on the prime coating layer; and forming a top coating layer by coating the syrup composition of the present invention on the intercoating layer.

EFFECT OF THE INVENTION

The syrup composition and the resin mortar composition of the present invention have low odor and can form a coating film that is excellent in surface curability and that has little coloring.

According to the method of coating of the present invention, a floor surface, a wall surface, a pavement surface of a road, or the like can be coated by the syrup composition and the resin mortar composition without raising a problem of odor at the time of operation.

BEST MODE FOR CARRYING OUT THE INVENTION

In the present invention, the term "(meth)acrylate" means "at least one of acrylate and methacrylate".

<Monomers (A)>

Monomers (A) are monomers, each having a molecular mass of 130 to 300 and one (meth)acryloyl group. When the molecular mass of each of monomers (A) is 130 or more, low odor of a syrup composition becomes good. When the molecular mass of each of monomers (A) is 300 or less, reactivity of the syrup composition becomes good.

The syrup composition of the present invention contains, as the monomers (A), 3 components of a heterocyclic ring-containing (meth)acrylate (a1) (hereinafter, expressed as a "monomer (a1)"), an oligoethylene glycol monoalkyl ether (meth)acrylate (a2) (hereinafter, expressed as a "monomer (a2)"), and a hydroxyalkyl (meth)acrylate (a3) having a hydroxyalkyl group with 2 or 3 carbon atoms (hereinafter, expressed as a "monomer (a3)") as indispensable components. Further, it is preferable that the syrup composition of the present invention contains, as an additional component of the monomers (A), an alkyl (meth)acrylate (a4) having a long-chain alkyl group with 4 to 15 carbon atoms (hereinafter, expressed as a "monomer (a4)").

(Monomer (a1))

The monomer (a1) has a molecular mass of 130 to 300, one (meth)acryloyl group, and a heterocyclic ring. The monomer (a1) is a component that adjusts characteristics such as viscosity of the syrup composition and mechanical strength of a coating film.

As the heterocyclic ring, a furan ring, a thiophene ring, a pyrrole ring, a pyrroline ring, a pyrrolidine ring, an oxazole ring, an isoxazole ring, a thiazole ring, an isothiazole ring, an imidazole ring, an imidazolidine ring, a pyrazole ring, a pyrazoline ring, a triazole ring, a frazane ring, a tetrazole ring, a pyran ring, a thymine ring, a pyridine ring, a piperidine ring, an oxazine ring, a morpholine ring, a thiazine ring, a pyridazine ring, a piperazine ring, an ether ring, a lactone ring, an imine ring, a lactam ring, each derivative of these rings, or the like can be listed.

As the monomer (a1), a (meth)acrylate having a heterocyclic ring selected from the group consisting of a furan ring, a hydrofuran ring, a pyran ring, and a hydropyran ring is preferable.

As the (meth)acrylate having a furan ring, furyl (meth)acrylate, furfryl (meth)acrylate, or the like can be listed.

As the (meth)acrylate having a hydrofuran ring, tetrahydrofuryl (meth)acrylate, tetrahydrofurfuryl (meth)acrylate, caprolactone modified tetrahydrofurfuryl (meth)acrylate, or the like can be listed.

As the (meth)acrylate having a pyran ring, pyranyl (meth)acrylate, or the like can be listed.

As the (meth)acrylate having a hydropyran ring, dihydropyranyl (meth)acrylate, tetrahydropyranyl (meth)acrylate, dimethyldihydropyranyl (meth)acrylate, dimethyltetrahydropyranyl (meth)acrylate, or the like can be listed.

As the monomer (a1), tetrahydrofurfryl methacrylate, caprolactone modified tetrahydrofurfuryl (meth)acrylate, dimethyldihydropyranyl methacrylate or dimethyltetrahydropyranyl methacrylate is particularly preferable.

The monomer (a1) can be used alone or in combination of two or more kinds.

The content of the monomer (a1) is preferably 10 to 70 parts by mass based on 100 parts by mass of the sum of (A), (B), and (C), and more preferably 10 to 60 parts by mass. By causing the content of the monomer (a1) to be 10 parts by mass or more, surface curability of the syrup composition and strength of the coating film are improved. By causing the content of the monomer (a1) to be 70 parts by mass or less, it is possible to prevent the coating film from getting hard and brittle.

(Monomer (a2))

The monomer (a2) is an oligoethylene glycol monoalkyl ether (meth)acrylate that has a molecular mass of 130 to 300 and one (meth)acryloyl group. The monomer (a2) is a component that adjusts viscosity of the syrup composition and flexibility of a coating film.

As the monomer (a2), ethylene glycol monomethyl ether methacrylate, ethylene glycol monoethyl ether methacrylate, diethylene glycol monomethyl ether (meth)acrylate, diethylene glycol monoethyl ether (meth)acrylate, 2-ethoxylated-2-ethylhexyl (meth)acrylate, polyethylene glycol monomethyl ether (meth)acrylate, polyethylene glycol monoethyl ether (meth)acrylate, or the like can be listed.

As the monomer (a2), ethylene glycol monomethyl ether methacrylate, ethylene glycol monoethyl ether methacrylate, diethylene glycol monomethyl ether (meth)acrylate or diethylene glycol monoethyl ether (meth)acrylate is preferable.

The monomer (a2) can be used alone or in combination of two or more kinds.

The content of the monomer (a2) is preferably 10 to 60 parts by mass based on 100 parts by mass of the sum of (A), (B), and (C), and more preferably 10 to 50 parts by mass. By causing the content of the monomer (a2) to be 10 parts by mass or more, flexibility of the coating film is improved. By causing the content of the monomer (a2) to be 60 parts by mass or less, the coating film does not become too soft, and balance of strength of the coating film becomes good.

(Monomer (a3))

The monomer (a3) is a monomer that has a molecular mass of 130 to 300, one (meth)acryloyl group, and a hydroxyalkyl group with 2 or 3 carbon atoms. The monomer (a3) is a component that adjusts reactivity of the syrup composition.

As the monomer (a3), 2-hydroxyethyl methacrylate, 2-hydroxypropyl acrylate, or 2-hydroxypropyl methacrylate can be listed.

As the monomer (a3), 2-hydroxyethyl methacrylate or 2-hydroxypropyl methacrylate is preferable.

The monomer (a3) can be used alone or in combination of two or more kinds.

The content of the monomer (a3) is preferably 5 to 40 parts by mass based on 100 parts by mass of the sum of (A), (B), and (C). By causing the content of the monomer (a3) to be 5 parts by mass or more, reactivity of the syrup composition is improved and surface curability of the syrup composition becomes good. By causing the content of the monomer (a3) to be 40 parts by mass or less, water resistance of a coating film becomes good.

(Monomer (a4))

The monomer (a4) is an alkyl (meth)acrylate that has a molecular mass of 130 to 300, a long-chain alkyl group with 4 to 15 carbon atoms, and one (meth)acryloyl group. The monomer (a4) is a component that improves dispersibility of a wax at the time of storing the syrup composition.

As the monomer (a4), n-butyl methacrylate, i-butyl methacrylate, t-butyl methacrylate, 2-ethylhexyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, or the like can be listed.

As the monomer (a4), dodecyl (meth)acrylate, tridecyl (meth)acrylate, tetradecyl (meth)acrylate, pentadecyl (meth)acrylate, a mixture of them, or the like is preferable because an improving effect on dispersibility of the wax at the time of storing the syrup composition becomes large.

The monomer (a4) can be used alone or in combination of two or more kinds.

The content of the monomer (a4) is preferably 2 to 35 parts by mass based on 100 parts by mass of the sum of (A), (B), and (C), and more preferably 2 to 30 parts by mass. By causing the content of the monomer (a4) to be 2 parts by mass or more, dispersibility of the wax (D) at the time of storing the syrup composition is improved. By causing the content of the monomer (a4) to be 35 parts by mass or less, solubility of a resin (C) becomes good.

(Monomer (a5))

The syrup composition of the present invention may contain a component of monomers (A) other than the monomers (a1) to (a4) (hereinafter, expressed as a "monomer (a5)"), so long as it doesn't deteriorate low odor and curability of the syrup composition.

As the monomer (a5), a hydroxyl group-containing (meth)acrylate such as 4-hydroxybutyl (meth)acrylate; a glycidyl group-containing methacrylate such as glycidyl methacrylate; a carboxylic acid-containing (meth)acrylate such as 2-(meth)acryloyloxyethyl succinate, 2-(meth)acryloyloxyethyl maleate, 2-(meth)acryloyloxyethyl phthalate, or 2-(meth)acryloyloxyethyl hexahydrophthalate; a polyalkylene glycol mono(meth)acrylate having a hydroxyl terminal group such as polyethylene glycol mono(meth)acrylate (recurring number of ethylene glycol units being 4 or less) or polypropylene glycol mono(meth)acrylate (recurring number of propylene glycol units being 2 or less); a fluorine atom-containing (meth)acrylate such as trifluoroethyl (meth)acrylate, tetrafluoroethyl (meth)acrylate, hexafluoroethyl (meth)acrylate, or octafluoroethyl acrylate; a di- or tri-alkylcyclohexyl group-containing (meth)acrylate such as dimethylcyclohexyl (meth)acrylate or trimethylcyclohexyl (meth)acrylate; a di- or tri-alkylphenyl group-containing (meth)acrylate such as dimethylphenyl (meth)acrylate or trimethylphenyl (meth)acrylate; or benzyl methacrylate, isobornyl methacrylate, dicyclopentenyloxyethyl (meth)acrylate, phenoxyethyl methacrylate, phenoxydiethylene glycol (meth)acrylate, or phenoxytriethylene glycol (meth)acrylate can be listed.

The content of the monomer (a5) is preferably 0 to 25 parts by mass based on 100 parts by mass of the sum of (A), (B), and (C).

Further, the content of the monomers (A) is preferably 60 to 90 parts by mass based on 100 parts by mass of the sum of (A), (B), and (C), and more preferably 65 to 85 part by mass. By causing the content of the monomers (A) to be 60 parts by mass or more, viscosity of the syrup composition does not become too high and workability becomes good. By causing the content of the monomers (A) to be 90 parts by mass or less, viscosity of the syrup composition does not become too low and coating with a proper coating thickness at the time of operation can be realized.

<Another Monomer>

The syrup composition of the present invention may contain another monomer such as a monomer that has a molecular mass of less than 130 and one (meth)acryloyl group; a monomer that has a molecular mass of more than 300 and one (meth)acryloyl group; or an allyl monomer, so long as the effect of the present invention is not prevented.

As the monomer that has a molecular mass of less than 130 and one (meth)acryloyl group, methyl (meth)acrylate, ethyl (meth)acrylate, (meth)acrylic acid, n-butyl acrylate, i-butyl acrylate, t-butyl acrylate, 2-hydroxyethyl acrylate, allyl (meth)acrylate, or the like can be listed.

As the monomer that has a molecular mass of more than 300 and one (meth)acryloyl group, a polyalkylene glycol mono(meth)acrylate having a hydroxyl terminal group such as stearyl (meth)acrylate, cetyl methacrylate, 2-(meth)acryloyloxyethyl-2-hydroxypropyl phthalate, octafluoropentyl methacrylate, heptadecafluorodecyl (meth)acrylate, polyethylene glycol mono(meth)acrylate (recurring number of ethylene glycol units being 5 or more), or polypropylene glycol mono(meth)acrylate (recurring number of propylene glycol units being 3 or more); a polyalkylene glycol monoalkylether (meth)acrylate such as polyethylene glycol monomethylether (meth)acrylate (recurring number of ethylene glycol units being 5 or more) can be listed.

As the allyl monomer, vinyl acetate, vinyl toluene, α-methylstyrene, diallyl phthalate, diallyl isophthalate, triallyl isocyanurate, diallyl tetrabrom phthalate, or the like can be listed.

<Monomer (B)>

Monomer (B) is a polyfunctional monomer having 2 or more (meth)acryloyl groups. The monomer (B) improves mechanical strength, abrasion resistance, and chemical resistance of a coating film.

As the monomer (B), ethylene glycol di(meth)acrylate, 1,3-propylene glycol di(meth)acrylate, 1,4-butanediol di(meth)acrylate, 1,6-hexanediol di(meth)acrylate, diethylene glycol di(meth)acrylate, polyethylene glycol di(meth)acrylate, polypropylene glycol di(meth)acrylate, polybutylene glycol di(meth)acrylate, di(meth)acrylate of ethylene oxide adduct of bisphenol A, di(meth)acrylate of propylene oxide adduct of bisphenol A, (meth)acrylic acid adduct of bisphenol A diglycidylether, neopentyl glycol di(meth)acrylate, 1,4-cyclohexanedimethanol di(meth)acrylate, tricyclodecane dimethanol di(meth)acrylate, trimethylolpropane tri(meth)acrylate, pentaerythritol tri(meth)acrylate, tris(2-(meth)acryloyloxyethyl)isocyanurate, pentaerythritol tetra(meth)acrylate, dipentaerythritol hexa(meth)acrylate, or the like can be listed.

The monomer (B) can be used alone or in combination of two or more kinds.

The content of the monomer (B) is preferably 0 to 20 parts by mass based on 100 parts by mass of the sum of (A), (B), and (C), and more preferably 0 to 10 parts by mass. By causing the content of the monomer (B) to be 20 parts by mass or less, curing time for completion of curing does not become too short, and workability becomes good.

<Resin (C)>

Resin (C) is soluble in the monomers (A) (preferably soluble in both the monomers (A) and the monomer (B)) and has a glass transition temperature (hereinafter, expressed as a "Tg") of 20 to 155° C. The resin (C) improves viscosity and curability of the syrup composition.

As the resin (C), a homopolymer or copolymer of an alkyl (meth)acrylate, an epoxy resin, a cellulose acetate butyrate resin, a diallyl phthalate resin, a saturated polyester resin, or the like can be listed. As the resin (C), the homopolymer or copolymer of an alkyl (meth)acrylate or the cellulose acetate butyrate resin is preferable. The resin (C) can be used alone or in combination of two or more kinds.

As a monomer that constitutes the homopolymer or copolymer of an alkyl (meth)acrylate, methyl (meth)acrylate, ethyl (meth)acrylate, propyl (meth)acrylate, n-butyl (meth)acrylate, i-butyl (meth)acrylate, t-butyl (meth)acrylate, amyl (meth)acrylate, hexyl (meth)acrylate, heptyl (meth)acrylate, 2-ethylhexyl (meth)acrylate, n-octyl (meth)acrylate, isoctyl (meth)acrylate, n-nonyl (meth)acrylate, isononyl (meth)acrylate, decyl (meth)acrylate, dodecyl (meth)acrylate, tridecyl (meth)acrylate, stearyl (meth)acrylate, cyclohexyl (meth)acrylate, benzyl (meth)acrylate, dicyclopentenyl (meth)acrylate, 2-dicyclopentenoxyethyl (meth)acrylate, isobornyl (meth)acrylate, methoxyethyl (meth)acrylate, ethoxyethyl (meth)acrylate, butoxyethyl (meth)acrylate, tetrahydrofurfuryl (meth)acrylate, 2-hydroxyethyl (meth)acrylate, 2-hydroxypropyl (meth)acrylate, 4-hydroxybutyl (meth)acrylate, (meth)acrylic acid, or the like can be listed.

The Tg of the resin (C) is 20 to 155° C. and preferably 20 to 105° C. By causing the Tg of the resin (C) to be 20° C. or above, surface curability of the syrup composition becomes good. By causing the Tg of the resin (C) to be 155° C. or below, solubility to the monomers (A) (preferably to the monomers (A) and the monomer (B)) at the time of producing the syrup composition becomes good. The Tg of the resin (C) is measured with a differential scanning calorimeter (DSC).

Mass average molecular mass (hereinafter, expressed as "Mw") of the resin (C) is preferably 5,000 to 200,000, and more preferably 10,000 to 180,000. By causing the Mw of the resin (C) to be 5,000 or more, strength of a coating film of the syrup composition can be improved. By causing the Mw of the resin (C) to be 200,000 or less, solubility to the monomers (A) (preferably to the monomers (A) and the monomer (B)) at the time of producing the syrup composition becomes good.

The Mw of the resin (C) is obtained by dissolving the resin into a solvent (tetrahydrofuran), measuring the molecular mass with gel permeation chromatography (hereinafter, expressed as "GPC"), and calculating the molecular mass in terms of polystyrene standards.

The content of the resin (C) is preferably 5 to 35 parts by mass based on 100 parts by mass of the sum of (A), (B), and (C). When the content of the resin (C) is too high, usable life of the syrup composition (time during which the syrup composition has fluidity and coating operation is possible) becomes short and workability becomes bad, though curing time can be shortened. When the content of the resin (C) is too low, balance of viscosity of the syrup composition collapses and curability of the syrup composition becomes bad.

It is preferable that the content of the resin (C) be within the range of from 5 to 35 parts by mass based on 100 parts by mass of the sum of (A), (B), and (C), and be within the range that fulfill the relation of the following equation.

$$[\text{Mw of the resin }(C)] \times [\text{part by mass of the resin }(C)] < 3{,}000{,}000$$

The following equation is used when the resin (C) is a mixture of a resin (c1), (c2), ...

$$[\text{Mw of the resin }(c1)] \times [\text{part by mass of the resin }(c1)] + [\text{Mw of the resin }(c2)] \times [\text{part by mass of the resin }(c2)] + \ldots < 3{,}000{,}000$$

When the relation of the above-mentioned equation is not fulfilled, viscosity of the syrup composition becomes too high and workability becomes bad.

<Wax (D)>

Wax (D) acts an action of improving surface curability using an action of intercepting air, or the like.

As the wax (D), a solid wax can be listed. As the solid wax, a higher aliphatic acid wax such as a paraffin wax, a polyethylene wax, or a stearic acid wax can be listed.

As the wax (D), the paraffin wax is preferable. As the paraffin wax, it is preferable to jointly use a combination of two or more kinds of waxes having different melting points. The melting point of the paraffin wax is preferably 40 to 80° C. By causing the melting point of the wax (D) to be 40° C. or above, sufficient action of intercepting air can be obtained when the syrup composition is coated and cured, and hence, surface curability becomes good. By causing the melting point of the wax (D) to be 80° C. or below, solubility to the monomers (A) (preferably to the monomers (A) and the monomer (B)) at the time of producing the syrup composition becomes good. Further, sufficient action of intercepting air can be obtained when the syrup composition is coated and cured, even in the case that a substrate temperature changes, and hence, surface curability becomes good by jointly using the paraffin waxes. When the paraffin waxes are jointly used, it is preferable to jointly use them having a difference in melting point of about 5 to 20° C. between them.

As the wax (D), one dispersed in an organic solvent is preferable in point of improving surface curability. Action of intercepting air can be effectively realized when the wax is dispersed in the organic solvent and made into fine particles. The wax (D) in a dispersed state is on the market, and the syrup composition of the present invention can be prepared by adding the foregoing wax as it is. In this case, the syrup composition of the present invention contains the organic solvent.

The wax (D) in a dispersed state may be the one in which the wax (D) is dispersed in the monomers (A) without containing the organic solvent at all.

The amount of addition of the wax (D) is preferably 0.1 to 5 parts by mass to 100 parts by mass of the sum of (A), (B), and (C), and more preferably 0.1 to 2 parts by mass from the viewpoint of balance between air curability and physical properties of a coating film. By causing the amount of addition of the wax (D) to be 0.1 part by mass or more, sufficient function of intercepting air can be obtained and surface curability becomes good when the syrup composition is coated and cured. By causing the amount of addition of the wax (D) to be 5 parts by mass or less, both storage stability of the syrup composition and stain resistance when the syrup composition is coated and cured become good.

<Tertiary Amine (E)>

Tertiary amine (E) is a curing accelerator to accelerate a curing reaction.

As the tertiary amine (E), aniline; or a N,N-substituted aniline, a N,N-substituted-p-toluidine, a 4-(N,N-substituted amino)benzaldehyde, or the like such as N,N-dimethylaniline, N,N-diethylaniline, p-toluidine, N,N-dimethyl-p-toluidine, N,N-bis(2-hydroxyethyl)-p-toluidine, 4-(N,N-dimethylamino)benzaldehyde, 4-[N,N-bis(2-hydroxyethyl)amino]benzaldehyde, 4-(N-methyl-N-hydroxyethylamino)benzaldehyde, N,N-bis(2-hydroxypropyl)-p-toluidine, N-ethyl-m-toluidine, triethanolamine, m-toluidine, diethylenetriamine, pyridine, phenylmorphorine, piperidine, N,N-bis(hydroxyethyl)aniline, or diethanolaniline can be listed.

As the tertiary amine (E), an aromatic tertiary amine is preferable. As the aromatic tertiary amine, one in which at least one aromatic residual group is directly bonded to a nitrogen atom is preferable. As the aromatic tertiary amine, N,N-dimethyl-p-toluidine, N,N-diethylaniline, N,N-diethyl-p-toluidine, N-(2-hydroxyethyl)N-methyl-p-toluidine, N,N-di(2-hydroxyethyl)-p-toluidine, or N,N-di(2-hydroxypropyl)-p-toluidine; or an ethylene oxide adduct or a propylene oxide adduct of N,N-di(2-hydroxyethyl)-p-toluidine, or an ethylene oxide adduct or a propylene oxide adduct of N,N-di(2-hydroxypropyl)-p-toluidine can be listed. Further, the aromatic tertiary amine is not limited to a para-substituted compound but also may be an ortho-substituted compound or a meta-substituted compound.

As the aromatic tertiary amine, N,N-dimethyl-p-toluidine, N,N-diethyl-p-toluidine, N,N-di(2-hydroxyethyl)-p-toluidine, or N,N-di(2-hydroxypropyl)-p-toluidine is preferable from the viewpoints of reactivity and curability of the syrup composition.

The tertiary amine (E) can be used alone or in combination of two or more kinds.

The tertiary amine (E) may be added to the syrup composition just before the syrup composition is cured or may be previously added to the syrup composition.

The amount of addition of the tertiary amine (E) is preferably 0.05 to 10 parts by mass to 100 parts by mass of the sum of (A), (B), and (C), more preferably 0.2 to 8 parts by mass, and particularly preferably 0.3 to 5 parts by mass from the viewpoint of balance between curability and pot life (workability) of the resultant syrup composition. By causing the amount of addition of the tertiary amine (E) to be 0.2 parts by mass or more, surface curability becomes good. By causing the amount of addition of the tertiary amine (E) to be 8 parts by mass or less, an appropriate usable life can be obtained.

<Another Curing Accelerator>

As a curing accelerator, a polyvalent metal soap such as cobalt naphthenate, cobalt octylate, or cobalt acetoacetylate can be listed other than the tertiary amine (E). However, there is a problem that the polyvalent metal soap exerts influence on the final appearance because the polyvalent metal soap forms a complex during polymerization of a monomer and the resultant coating film is colored. The syrup composition of the present invention can provide a coating film with little coloring because the amount of the addition of the polyvalent metal soap, which has been conventionally added to cure the syrup composition, can be reduced owing to a good surface curability of the syrup composition. In the case that a coating film with further less coloring is required, it is preferable that the syrup composition does not substantially comprise the polyvalent metal soap which is a curing accelerator. It is preferable that the syrup composition of the present invention be the one in which a YI value of a cured material is less than 20 when the syrup composition is applied so that the thickness of the coating film made of the syrup composition is 1 mm and the coating film is cured to be the cured material.

The expression "does not substantially comprise" means that the content of a metal derived from the polyvalent metal soap is 0.01 parts or less to 100 parts by mass of the sum of (A), (B), and (C). When the content of the metal is 0.01 parts by mass or less, a coating film to be obtained does not have conspicuous coloring even in the case where a complex is formed during polymerization of a monomer, and there is almost no influence on the final appearance.

<Polymerization Initiator>

It is preferable to use a redox catalyst in which a curing accelerator and a curing agent are combined in order to cure the syrup composition of the present invention.

As the curing agent, well-known polymerization initiators that are able to initiate radical polymerization can be listed. As the polymerization initiator, a diacyl peroxide, an alkyl peroxide, a ketone peroxide, an azo compound, or the like can be listed.

As the polymerization initiator, diacyl peroxide is preferable, and benzoyl peroxide is particularly preferable. As the benzoyl peroxide, the one in a liquid state, a paste state, or a powder state which is diluted to a concentration of 30 to 55% by mass by an inert liquid or solid is preferable from the view point of handleability.

The curing agent can be used alone or in combination of two or more kinds.

It is preferable to properly adjust the amount of addition of the curing agent so that the usable life of the syrup composition may become in the range of from 20 to 60 minutes. When the curing agent is added in the above-mentioned range of time, polymerization reaction starts immediately after the addition, and curing of the syrup composition advances.

The amount of addition of the benzoyl peroxide is preferably 0.25 to 5 parts by mass to 100 parts by mass of the sum of (A), (B), and (C), and more preferably 0.25 to 4 parts by mass. By causing the amount of addition of the benzoyl peroxide to be 0.25 parts by mass or more, curability tends to become good. By causing the amount of addition of the benzoyl peroxide to be 5 parts by mass or less, coating workability of the syrup composition to be obtained and various physical properties of the coating film to be obtained tend to be improved.

<Plasticizer>

A plasticizer may be added to the syrup composition of the present invention in order to promote flexibility of a coating film and reduction of contraction at the time of curing.

As the plasticizer, a dibasic aliphatic acid ester like a phthalate such as dibutyl phthalate, di-2-ethylhexyl phthalate, or diisodecyl phthalate; an adipate such as di-2-ethylhexyl adipate or octyl adipate; a sebacate such as dibutyl sebacate or di-2-ethylhexyl sebacate; or an azelate such as di-2-ethylhexyl azelate or octyl azelate; or a paraffin such as chlorinated paraffin can be listed.

The plasticizer can be used alone or in combination of two or more kinds.

The amount of addition of the plasticizer is preferably 20 parts by mass or less to 100 parts by mass of the sum of (A), (B), and (C). When the amount of addition of the plasticizer is 20 parts by mass or less, curability of the syrup composition becomes good and there isn't any case that the plasticizer bleeds out on the surface of a coating film.

<Silane Coupling Agent>

A silane coupling agent may be added to the syrup composition of the present invention with the view of giving the syrup composition stabilization of an adhesive properties to the substrate and durability of adhesive strength.

As the silane coupling agent, vinyl trichlorosilane, vinyl tris(P-methoxyethoxy) silane, γ-methacryloyloxypropyl trimethoxysilane, β-(3,4-epoxycyclohexyl)ethyltrimethoxysilane, γ-glucidoxypropyl trimethoxysilane, γ-mercaptopropyl trimethoxysilane, or the like can be listed.

The amount of addition of the silane coupling agent is preferably 10 parts by mass or less to 100 parts by mass of the sum of (A), (B), and (C), and more preferably 5 parts by mass or less from the viewpoints of curabilitry and costs. By causing the amount of addition of the silane coupling agent to be 10 parts by mass or less, surface curability becomes good while stabilization of the adhesive properties of the syrup composition to the substrate is maintained.

<Polymerization Inhibitor>

A polymerization inhibitor may be added to the syrup composition of the present invention with the view of improving storage stability and adjusting polymerization reaction.

As the polymerization inhibitor, hydroquinone, hydroquinone monomethyl ether, 2,4-dimethyl-6-t-butylphenol, or the like can be listed.

<Oligomer>

An oligomer having a (meth)acryloyl group may be added to the syrup composition of the present invention in order to improve surface curability.

As the oligomer, a urethane (meth)acrylate, an epoxy (meth)acrylate, a polyester (meth)acrylate, or the like can be listed.

The urethane (meth)acrylate is obtained by reacting a (meth)acrylate having a hydroxyl group, a polyisocyanate having two or more isocyanate groups in a molecule, and a polyol having two or more hydroxyl groups in a molecule with a well-known method.

The epoxy (meth)acrylate is obtained by reacting a partially esterified compound obtained by reacting a (meth)acrylate having a hydroxyl group and a polybasic acid anhydride, a bifunctional bisphenol A type epoxy resin, and an unsaturated monobasic acid with a well-known method. The bifunctional bisphenol A type epoxy resin is a general-purpose epoxy resin obtained by reacting a bisphenol A with an epichlorohydrine.

The polyester (meth)acrylate is obtained from a polybasic acid such as phthalic acid, isophthalic acid, tetrahydrophthalic acid, succinic acid, maleic acid, fumaric acid, adipic acid or an unhydride thereof, a polyol such as ethylene glycol or propylene glycol, and a (meth)acrylic acid adduct or glycidyl (meth)acrylate.

<Another Additive>

An ultraviolet absorber such as benzotriazole derivative, a hindered amine type light stabilizer, an antioxidant, a defoaming agent, a leveling agent, a thixotropic agent such as an aerosil, a body pigment such as calcium carbonate, an inorganic pigment such as chromium oxide or red oxide of iron, or an organic pigment such as phthalocyanine blue may be added to the syrup composition of the present invention when it is needed.

As the defoaming agent, a well-known defoaming agent can be used. As the defoaming agent, an acrylic defoaming agent obtained by dissolving a specific acrylic polymer into a solvent or a vinyl defoaming agent obtained by dissolving a specific vinyl polymer into a solvent is preferable, and one of "DISPARLON" series sold from Kusumoto Chemicals, Ltd. (trade name: OX-880EF, OX-881, OX-883, OX-77EF, OX-710, OX-8040, 1922, 1927, 1950, P-410EF, P-420, P-425, PD-7, 1970, 230, 230HF, LF-1980, LF-1982, LF-1983, LF-1984, LF-1985, or the like) is more preferable, and 230, 230HF, LF-1980, or LF-1985 among the DISPARLON series is furthermore preferable, and 230 or LF-1985 is particularly preferable.

<Resin Mortar Composition>

The resin mortar composition of the present invention is the one in which an aggregate is compounded to the syrup composition of the present invention.

As the aggregate, one in which an average particle diameter is 1 μm or more and oil absorption with respect to linseed oil is 25 cc per 100 g of the aggregate or less is preferable. As the aggregate, rock powder such as sand, silica sand, quartz sand, a colored one or a calcined one of these materials, quartz powder, or silica powder; one obtained by calcining and pulverizing ceramics; an inorganic filler such as calcium carbonate, alumina, or a glass bead, or the like can be listed. It is preferable that the aggregate be the one in which aggregates with different diameters be mixed from the viewpoints of coating workability and self-leveling properties.

The amount of compounding of the aggregate is preferably 50 to 1,000 parts by mass to 100 parts by mass of the sum of (A), (B), and (C) from the viewpoints of mixability with the syrup composition, coating ability, curability, and physical properties of a coating film.

Various additives such as a thixotropic agent may be added to the resin mortar composition of the present invention when it is needed.

The syrup composition and the resin mortar composition of the present invention explained above have low odor because they use the specific monomers (a1) to (a3). Further, they can form a coating film having excellent surface curability and little coloring even in the case that the amount of addition of the polyvalent metal soap is small because the specific monomers (a1) to (a3), the resin (C), the wax (D), and the tertiary amine (E) are combined in them. Further, a coating film with further less coloring can be formed in the case that the polyvalent metal soap is not substantially comprised in them.

<Method of Coating>

The syrup composition and the resin mortar composition of the present invention can be used as a material for coating of floor surfaces, wall surfaces, pavement surfaces of roads, or the like.

As a method of coating on an application surface such as a floor surface, a wall surface, a pavement surface of a road, or the like, a method in which a coating film is formed on the application surface by coating the syrup composition or the resin mortar composition of the present invention on the application surface can be used. It is possible to form a top coating layer (top coat) on the application surface by coating the syrup composition on the application surface. In the case of forming a prime coating layer and a top coating layer (top coat) on the application surface, it is possible to coat the syrup composition as at least one of the layers. As the prime coating layer, the resin mortar composition can also be coated. In the case of forming a prime coating layer, an intercoating layer, and a top coating layer (top coat) on the application surface, it is possible to coat the syrup composition as at least one of the layers. As the intercoating layer, the resin mortar composition can also be coated.

As the method of coating on an application surface such as a floor surface, a wall surface, a pavement surface of a road, or the like, for example, a method of forming a prime coating layer by coating the syrup composition on an application surface, forming an intercoating layer by coating the resin mortar composition on the prime coating layer, and forming a top coating layer (top coat) by coating the syrup composition on the intercoating layer is most preferable.

As the method of coating, a well-known coating method such as a method of using a roller, a metal trowel, a brush, an adjustable broom, or a coater (spray coater or the like) can be listed.

Another layer may be provided between the prime coating layer and the intercoating layer or between the intercoating layer and the top coating layer.

As for the method of coating of the present invention explained above, there is no problem with odor at the time of operation because the syrup composition or the resin mortar composition which has low odor and excellent surface curability. It is possible to set a proper usable life in accordance with a kind of an operation with respect to the syrup composition or the resin mortar composition of the present invention by adjusting an amount of compounding of a polymerization initiator or the like in the case that a polyvalent metal soap is not substantially comprised. Further, the syrup composition or the resin mortar composition of the present invention can realize an excellent coloring in the case of being used as a top coating layer or as a prime coating layer or an intercoating layer under a transparent top coating layer because there is no coloring with a polyvalent metal soap.

EXAMPLES

Hereinafter, the present invention will be concretely explained by examples. However, the present invention is not limited to these examples.

In these examples, "part" means "part by mass" and "%" means "% by mass" with the exception of humidity.

Synthesis Example 1

Synthesis of Oligomer 1:

To a container equipped with a stirrer, a temperature control system, and a condenser, 250 parts of diphenylmethane-4,4'-diisocyanate (trade name: MILLIONATE MT, manufactured by Nippon Polyurethane Industry Co., Ltd.), 348 parts of trilene diisocyanate (trade name: CORONATE T-80, manufactured by Nippon Polyurethane Industry Co., Ltd.), 9.39 parts of dimethylaminoethyl methacrylate, 2104 parts of tetrahydrofurfuryl methacrylate (hereinafter, abbreviated to "THFMA"), and 1.88 parts of 2,6-di-tert-butyl-4-methylphenol (hereinafter, abbreviated to "BHT") as a polymerization inhibitor were added, and the resultant system was heated to 50° C. while stirred. Then, a mixture of 1006 parts of carbonate diol (trade name: UH-CARB 50, manufactured by Ube Industries, Ltd.) and 877 parts of THFMA was divided equally into 20 and the resultant divided ones were added to the container at intervals of 12 minutes, and subsequently, 351 parts of THFMA was divided equally into 10 and the resultant divided ones were added to the container at intervals of 6 minutes while this temperature was maintained. Further, 273 parts of 2-hydroxyethyl methacrylate (hereinafter, abbreviated to "2-HEMA") was added dropwise to the container over 1 hour while this temperature was maintained for 1 hour, and 175 parts of THFMA was further added to the container. Subsequently, the resultant system was heated to 85° C., and the reaction was finished when a reaction rate of a isocyanate group became 98.5% by mole or more, and the resultant system was cooled to 30° C. to obtain a solution of oligomer 1 in which the content of the oligomer 1 is 35% by mass.

Production Example 1

Production of Syrup Composition S-1

To a 1 L container equipped with a stirrer and a condenser, 30 parts of THFMA, 35 parts of diethylene glycol monomethylether methacrylate (hereinafter, abbreviated to "DEGMMA"), 20 parts of 2-hydroxypropyl methacrylate (hereinafter, abbreviated to "2-HPMA"), 0.4 parts of paraffin wax having a melting point of 47° C. (hereinafter, abbreviated to "Wax 1"), 0.3 parts of paraffin wax having a melting point of 55° C. (hereinafter, abbreviated to "Wax 2"), 0.3 parts of paraffin wax having a melting point of 66° C. (hereinafter, abbreviated to "Wax 3"), 0.6 parts of N,N-dihydroxyethyl-p-toluidine (hereinafter, abbreviated to "Amine 1"), 1 part of a silane coupling agent (trade name: KBM-403, manufactured by Shin-Etsu Chemical Co., Ltd.), 1 part of a defoaming agent (trade name: BYK-1752, manufactured by BYK Japan KK), and 0.08 parts of BHT were added. Then, 15 parts of copolymer (Tg of 84° C., Mw of 80,000, hereinafter, abbreviated to "Polymer-1") of methyl methacrylate (hereinafter, abbreviated to "MMA")/n-butyl methacrylate (hereinafter, abbreviated to "n-BMA") of 80/20 was introduced to the container while the system was stirred, and the resultant system was heated at 70° C. for 2 hours, dissolved, and cooled to obtain syrup composition S-1.

Production Examples 2 to 18

Production of Syrup Compositions S-2 to S-18

The same procedure as in the production of the syrup composition S-1 was carried out except that each compositional ratio shown in Table 1, Table 2, and Table 3 was adapted to obtain each of syrup compositions S-2 to S-18.

TABLE 1

| Compounding (part) | | | Production Example | | | | | |
|---|---|---|---|---|---|---|---|---|
| | | | 1 | 2 | 3 | 4 | 5 | 6 |
| | | Syrup composition | S-1 | S-2 | S-3 | S-4 | S-5 | S-6 |
| (A) | (a1) | THFMA | 30 | 20 | 19 | 19 | 20 | 50 |
| | (a2) | DEGMMA | 35 | 45 | 42 | 42 | 30 | 20 |
| | (a3) | 2-HPMA | 20 | 20 | 10 | 19.5 | 30 | — |
| | | 2-HEMA | — | — | — | — | — | 10 |
| | | Monomer 1 | — | — | 9.5 | — | — | — |
| (B) | | TEGDMA | | 5 | 5 | 5 | 5 | 5 |

TABLE 1-continued

| Compounding (part) | | Production Example | | | | | |
|---|---|---|---|---|---|---|---|
| | | 1 | 2 | 3 | 4 | 5 | 6 |
| (C) | Polymer 1 | 15 | 10 | 9.5 | 9.5 | 15 | 15 |
| | Polymer 2 | — | — | 5 | 5 | — | — |
| (D) | Wax 1 | 0.4 | 0.5 | 0.5 | 0.5 | 0.4 | 0.4 |
| | Wax 2 | 0.3 | 0.4 | 0.4 | 0.4 | 0.3 | 0.3 |
| | Wax 3 | 0.3 | 0.3 | 0.3 | 0.3 | 0.3 | 0.3 |
| | BYK-LP-S6665 | — | — | — | — | — | 2 |
| (E) | Amine 1 | 0.6 | 0.7 | 0.8 | 0.8 | 0.6 | 0.5 |
| | Amine 2 | — | — | — | — | — | — |
| Polymerization inhibitor | BHT | 0.08 | 0.08 | 0.08 | 0.08 | 0.10 | 0.08 |
| Oligomer component | Oligomer 1 | — | — | — | — | — | — |
| Silane coupling agent | KBM-403 | 1 | — | — | — | 1 | 1 |
| Plasticizer | V-105 | — | — | — | 10 | — | — |
| Defoaming agent | BYK-1752 | 1 | 1 | 1 | 1 | 1 | 1 |
| Viscosity of syrup composition (mPa·s) | | 330 | 100 | 200 | 230 | 300 | 310 |

TABLE 2

| Compounding (part) | | | Production Example | | | | |
|---|---|---|---|---|---|---|---|
| | | | 7 | 8 | 9 | 10 | 11 |
| | | Syrup composition | S-7 | S-8 | S-9 | S-10 | S-11 |
| (A) | (a1) | THFMA | 25.5 | 85 | — | 38 | — |
| | (a2) | DEGMMA | 38.5 | — | 82.5 | 42.5 | 42.5 |
| | (a3) | 2-HPMA | 15.5 | — | — | — | 38 |
| | | 2-HEMA | — | — | — | — | — |
| | | Monomer 1 | — | — | — | — | — |
| (B) | | TEGDMA | 5 | 15 | 3 | 5 | 5 |
| (C) | | Polymer 1 | 15.5 | — | 9.5 | 9.5 | 9.5 |
| | | Polymer 2 | — | — | 5 | 5 | 5 |
| (D) | | Wax 1 | 0.4 | — | 0.4 | 0.5 | 0.5 |
| | | Wax 2 | 0.3 | 0.4 | 0.3 | 0.4 | 0.4 |
| | | Wax 3 | 0.3 | 1.0 | 0.3 | 0.3 | 0.3 |
| | | BYK-LP-S6665 | 2 | — | — | — | — |
| (E) | | Amine 1 | 0.6 | — | 0.6 | 0.6 | 0.8 |
| | | Amine 2 | — | 1.2 | — | — | — |
| Polymerization inhibitor | | BHT | 0.08 | — | 0.08 | 0.08 | 0.08 |
| Oligomer component | | Oligomer 1 | — | 47 | — | — | — |
| Silane coupling agent | | KBM-403 | 1 | — | — | — | — |
| Plasticizer | | V-105 | — | — | — | — | — |
| Defoaming agent | | BYK-1752 | 1 | — | 1 | 1 | 1 |
| Viscosity of syrup composition (mPa·s) | | | 450 | 500 | 190 | 180 | 210 |

TABLE 3

| Compounding (part) | | | Production Example | | | | | | |
|---|---|---|---|---|---|---|---|---|---|
| | | | 12 | 13 | 14 | 15 | 16 | 17 | 18 |
| | | Syrup composition | S-12 | S-13 | S-14 | S-15 | S-16 | S-17 | S-18 |
| (A) | (a1) | THFMA | 20 | 20 | 15 | 20 | 20 | 20 | 67 |
| | (a2) | DEGMMA | 40 | 35 | 15 | — | 35 | 35 | — |
| | (a3) | 2-HPMA | 20 | 20 | 20 | 20 | 20 | 20 | 10 |
| | | 2-HEMA | — | — | — | — | — | — | — |
| | (a4) | SLMA | 5 | — | 30 | 45 | 10 | 10 | — |
| | | 12MA | — | 10 | — | — | — | — | — |
| | | Monomer 1 | — | — | — | — | — | — | — |

TABLE 3-continued

| Compounding (part) | | 12 | 13 | 14 | 15 | 16 | 17 | 18 |
|---|---|---|---|---|---|---|---|---|
| (B) | TEGDMA | 5 | 5 | 5 | 5 | 5 | 5 | 5 |
| (C) | Polymer 1 | 5 | 5 | 5 | 5 | 5 | 5 | 10 |
|  | Polymer 2 | 5 | 5 | 10 | 5 | 5 | 5 | 8 |
| (D) | Wax 1 | 0.5 | 0.5 | 0.5 | 0.5 | 0.5 | 0.5 | — |
|  | Wax 2 | 0.4 | 0.4 | 0.4 | 0.4 | 0.4 | 0.4 | 0.8 |
|  | Wax 3 | 0.3 | 0.3 | 0.3 | 0.3 | 0.3 | 0.3 | 0.8 |
|  | BYK-LP-S6665 | — | — | — | — | — | — | — |
| (E) | Amine 1 | 0.7 | 0.7 | 0.7 | 0.7 | 0.5 | 0.5 | 0.5 |
|  | Amine 2 | — | — | — | — | — | — | — |
| Polymerization inhibitor | BHT | 0.08 | 0.08 | 0.08 | 0.08 | 0.08 | 0.08 | 0.05 |
| Oligomer component | Oligomer 1 | — | — | — | — | — | — | — |
| Silane coupling agent | KBM-403 | — | — | — | — | — | — | — |
| Plasticizer | V-105 | — | — | — | — | — | — | — |
| Defoaming agent | BYK-1752 | 1 | 1 | 1 | 1 | — | — | — |
|  | LF-1985 | — | — | — | — | 0.5 | — | — |
|  | 230 | — | — | — | — | — | 0.5 | 0.5 |
| Viscosity of syrup composition (mPa · s) | | 140 | 100 | 230 | Resin separated | 130 | 130 | 680 |

The abbreviations in the tables are as follows.
THFMA: Tetrahydrofurfuryl methacrylate
DEGMMA: Diethylene glycol monomethylether methacrylate
2-HPMA: 2-Hydroxypropyl methacrylate
2-HEMA: 2-Hydroxyethyl methacrylate
SLMA: A mixture of mass ratio 4/6 of dodecyl methacrylate/tridecyl methacrylate
12MA: Dodecyl methacrylate
Monomer 1: Dicyclopentenyloxyethyl methacrylate
TEGDMA: Triethylene glycol dimethacrylate
MMA: Methyl methacrylate
n-BMA: n-Butyl methacrylate
Polymer 1: Copolymer (Tg of 84° C., Mw of 80,000) of MMA/n-BMA of 80/20
Polymer 2: Copolymer (Tg of 64° C., Mw of 20,000) of MMA/n-BMA of 60/40
Wax 1: Paraffin wax having a melting point of 47° C. (manufactured by Nippon Seiro Co., Ltd.)
Wax 2: Paraffin wax having a melting point of 55° C. (manufactured by Nippon Seiro Co., Ltd.)
Wax 3: Paraffin wax having a melting point of 66° C. (manufactured by Nippon Seiro Co., Ltd.)
BYK-LP-S6665: Wax dispersion (trade name: BYK-LP-S6665, manufactured by BYK Japan KK)
Amine 1: N,N-Dihydroxyethyl-p-toluidine
Amine 2: N,N-Bis(2-hydroxypropyl)-p-toluidine
BHT: 2,6-Di-tert-butyl-4-methylphenol
Oligomer 1: Oligomer 1 obtained in the production example 1 KBM-403: Silane coupling agent (trade name: KBM-403, manufactured by Shin-Etsu Chemical Co., Ltd.)
V-105: Di-normaldecyl phthalate (trade name: VINYCIZER 105, manufactured by Kao Corporation)
BYK-1752: Defoaming agent (trade name: BYK-1752, manufactured by BYK Japan KK)
LF-1985: Defoaming agent (trade name: DISPARLON LF-1985, manufactured by Kusumoto Chemicals, Ltd.)
230: Defoaming agent (trade name: DISPARLON 230, manufactured by Kusumoto Chemicals, Ltd.)

Example 1

The following measurements and evaluations were carried out on the syrup composition S-1. The results are shown in Table 4.

(1) Viscosity:
Viscosity of the syrup composition S-1 was measured according to the measuring method which will be described later.

(2) Curing Time:
The syrup composition S-1 was placed in a thermostatic water bath kept at 20° C. for 2 hours and 2 parts of 50% granular benzoyl peroxide (trade name: CADOX B-CH50, manufactured by Kayaku Akzo Corporation, hereinafter, abbreviated to "B-CH50") to 100 parts of the syrup composition S-1 was added as a polymerization initiator. The resultant system was sufficiently stirred, and then, curing time (minutes) was measured according to the measuring method which will be described later.

(3) Odor Test:
Odor of the syrup composition S-1 was evaluated according to the evaluation method which will be described later.

(4) Property of Cured Material:
In a room at an ambient temperature of 23° C., to 100 parts of the syrup composition S-1, 2 parts of B-CH50 was added as a polymerization initiator, and the resultant system was stirred and mixed, and then, a degassing operation was carried out. The property of the resultant cured material was evaluated according to the evaluation method which will be described later.

(5) Coloring (YI Value):
To 100 parts of the syrup composition S-1, 2 parts of B-CH50 was added as a polymerization initiator, and the resultant system was stirred and mixed, and coloring was evaluated according to the evaluation method which will be described later.

(6) Roller Coatability:
To 100 parts of the syrup composition S-1, 2 parts of B-CH50 was added as a polymerization initiator, and the resultant system was stirred and mixed, and roller coatability (coating workability, surface curability) were evaluated according to the evaluation methods which will be described later.

(7) Mortar Coatability:
To 100 parts of the syrup composition S-1, 2 parts of B-CH50 was added as a polymerization initiator, and the resultant system was stirred and mixed, and 400 parts of an aggregate (trade name: KM-17A, manufactured by Ryoko Co., Ltd.) to 100 parts of the syrup composition S-1 was added. The resultant system was sufficiently stirred to obtain a resin mortar composition. Mortar coatability of the resin mortar composition were evaluated according to the evaluation methods which will be described later.
(8) Wax Dispersibility:
The syrup composition S-1 was stored in a container right after the syrup composition S-1 had been produced, and left to stand for 30 days in a room at an ambient temperature of 23° C., and wax dispersibility was evaluated according to the evaluation method which will be described later.
(9) Stability of Defoaming Agent:
The syrup composition S-1 was stored in a container right after the syrup composition S-1 had been produced, and left to stand in a room at an ambient temperature of 23° C., and stability of a defoaming agent was evaluated according to the evaluation method which will be described later.

Examples 2 to 7, Comparative Examples 1 to 4

The same procedures of measurements and evaluations as in Example 1 were carried out except that the syrup composition S-1 was changed to each of the syrup compositions S-2 to S-11. The results are shown in Table 4.

Example 8

The following measurements and evaluations were carried out on the syrup composition S-2. The results are shown in Table 4. The results of the aforementioned (1), (3), and (8) of Example 8 are the same as those of Example 2 because these evaluations are carried out merely on the syrup composition S-2 which does not contain cobalt naphthenate.
(2) Curing Time:
The syrup composition S-2 was placed in a thermostatic water bath kept at 20° C. for 2 hours and 1 part of 6% cobalt naphthenate solution (trade name: cobalt naphthenate (6%), manufactured by Nihon Kagaku Sangyo Co., Ltd., hereinafter, abbreviated to "Co naphthenate solution") to 100 parts of the syrup composition S-2 was added as a curing accelerator and the resultant mixture was sufficiently stirred. Two parts of B-CH50 was added as a polymerization initiator, the resultant system was sufficiently stirred, and then, curing time (minutes) was measured according to the measuring method which will be described later.
(4) Property of Cured Material:
In a room at an ambient temperature of 23° C., to 100 parts of the syrup composition S-2, 1 part of Co naphthenate solution was added as a curing accelerator and the resultant mixture was sufficiently stirred, and 2 parts of B-CH50 was added as a polymerization initiator, and the resultant system was stirred and mixed, and then, a degassing operation was carried out. The property of the resultant cured material was evaluated according to the evaluation method which will be described later.
(5) Coloring (YI Value):
To 100 parts of the syrup composition S-2, 1 part of Co naphthenate solution was added as a curing accelerator and the resultant mixture was sufficiently stirred, and 2 parts of B-CH50 was further added as a polymerization initiator, and the resultant system was stirred and mixed, and then, coloring was evaluated according to the evaluation method which will be described later.
(6) Roller Coatability:
To 100 parts of the syrup composition S-2, 1 part of Co naphthenate solution was added as a curing accelerator and the resultant mixture was sufficiently stirred, and 2 parts of B-CH50 was further added as a polymerization initiator, and the resultant system was stirred and mixed, and then, roller coatability (coating operability, surface curability) was evaluated according to the evaluation methods which will be described later.
(7) Mortar Coatability:
To 100 parts of the syrup composition S-2, 1 part of Co naphthenate solution was added as a curing accelerator and the resultant mixture was sufficiently stirred, and 2 parts of B-CH50 was further added as a polymerization initiator, and the resultant system was stirred and mixed. 400 parts of an aggregate (trade name: KM-17A, manufactured by Ryoko Co., Ltd.) to 100 parts of the syrup composition S-2 was further added, and the resultant system was sufficiently stirred to obtain a resin mortar composition. Mortar coatability of the resin mortar composition was evaluated according to the evaluation methods which will be described later.

Comparative Example 5

The same procedures of measurements and evaluations as in Example 8 were carried out except that the syrup composition S-2 was changed to the syrup composition S-8. The results are shown in Table 4. The results of the aforementioned (1), (3), and (8) of Comparative Example 5 are the same as those of Comparative Example 1 because these evaluations are carried out merely on the syrup composition S-8 which does not contain cobalt naphthenate.

Examples 9 to 11

The same procedures of measurements and evaluations as in Example 1 were carried out except that the syrup composition S-1 was changed to each of the syrup compositions S-12 to S-14. The results are shown in Table 5. Evaluations on the syrup composition S-15 could not be carried out because a normal syrup composition could not be obtained.

Examples 12 and 13

Comparative Example 6

The same procedures of measurements and evaluations as in Example 1 were carried out except that the syrup composition S-1 was changed to each of the syrup compositions S-16, S-17, and S-18, and 40% paste of benzoyl peroxide (trade name: NYPER NS, manufactured by NOF CORPORATION, hereinafter, abbreviated to "NYPER NS") was used instead of B-CH50 as a polymerization initiator. The results are shown in Table 5.

TABLE 4

| | | Example | | | | | | | | Comparative Example | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| Property of Resin | Syrup composition | S-1 | S-2 | S-3 | S-4 | S-5 | S-6 | S-7 | S-2 | S-8 | S-9 | S-10 | S-11 | S-8 |
| | Viscosity (mPa·s) | 330 | 100 | 200 | 230 | 300 | 310 | 450 | 100 | 500 | 190 | 180 | 210 | 500 |
| | Co naphthenate solution (part) | — | — | — | — | — | — | — | 1 | — | — | — | — | 1 |
| | B-CH50 (part) | 2 | 2 | 2 | 2 | 2 | 2 | 2 | 2 | 2 | 2 | 2 | 2 | 2 |

TABLE 4-continued

|  |  | Example | | | | | | | | Comparative Example | | | | |
|---|---|---|---|---|---|---|---|---|---|---|---|---|---|---|
|  |  | 1 | 2 | 3 | 4 | 5 | 6 | 7 | 8 | 1 | 2 | 3 | 4 | 5 |
|  | Curing time (min) | 34 | 25 | 22 | 29 | 27 | 23 | 26 | 28 | 22 | 42 | 53 | 21 | 25 |
|  | Odor test | A | A | A | A | A | A | A | A | A | A | A | A | A |
| Property of cured material | Coating film strength (N/mm$^2$) | 6.1 | 8.8 | 6.4 | 2.6 | 17.1 | 21.0 | 12.0 | 9.5 | 19.1 | 3.6 | 3.7 | 5.2 | 20.0 |
|  | Elongation of coating film (%) | 200 | 70 | 135 | 118 | 16 | 3 | 20 | 65 | 7 | 50 | 320 | 3 | 5 |
| Coloring | YI value | A | A | A | A | A | A | A | C | B | A | A | A | C |
| Roller Coatability | Coating workability | A | A | A | A | A | A | A | A | A | A | A | A | A |
|  | Surface curability | A | A | A | A | A | A | A | A | C | C | C | C | A |
| Mortar Coatability | Coating workability | A | A | A | A | A | A | A | A | A | A | A | A | A |
|  | Surface curability | A | A | A | A | A | A | A | A | C | C | C | C | A |
| Wax dispersibility | | B | B | B | B | B | B | B | B | B | B | C | B | B |
| Stability of defoaming agent | | B | B | B | B | B | B | B | B | Not Evaluated | B | B | B | Not Evaluated |

TABLE 5

|  |  | Example | | | | | Comparative Example |
|---|---|---|---|---|---|---|---|
|  |  | 9 | 10 | 11 | 12 | 13 | 6 |
|  | Syrup composition | S-12 | S-13 | S-14 | S-16 | S-17 | S-18 |
| Property of Resin | Viscosity (mPa · s) | 140 | 100 | 230 | 130 | 130 | 680 |
|  | Co naphthenate solution (part) | — | — | — | — | — | — |
|  | B-CH50 (part) | 2 | 2 | 2 | — | — | — |
|  | NYPER NS (part) | — | — | — | 3 | 3 | 3 |
|  | Curing time (min) | 23 | 20 | 19 | 25 | 25 | 20 |
|  | Odor test | A | A | A | A | A | A |
| Property of cured material | Coating film strength (N/mm$^2$) | 6.0 | 5.6 | 6.8 | 8.0 | 7.5 | 14.0 |
|  | Elongation of coating film (%) | 90 | 100 | 90 | 100 | 110 | 1 |
| Coloring | YI value | A | A | A | A | A | A |
| Roller Coatability | Coating workability | A | A | A | A | A | A |
|  | Surface curability | A | A | A | A | A | A |
| Mortar Coatability | Coating workability | A | A | A | A | A | A |
|  | Surface curability | A | A | A | A | A | A |
| Wax dispersibility | | A | A | A | A | A | B |
| Stability of defoaming agent | | B | B | B | A | A | A |

The abbreviations in the tables are as follows.

Co naphthenate solution (part): Part of 6% cobalt naphthenate solution (trade name: cobalt naphthenate (6%), manufactured by Nihon Kagaku Sangyo Co., Ltd.) to 100 parts of a syrup composition B-CH50 (part): Part of 50% granular benzoyl peroxide (trade name: CADOX B-CH50, manufactured by Kayaku Akzo Corporation) to 100 parts of a syrup composition NYPER NS (part): Part of 40% paste of benzoyl peroxide (trade name: NYPER NS, manufactured by NOF CORPORATION) to 100 parts of a syrup composition Measurement and Evaluation Methods (1) Viscosity:

A syrup composition was placed in a thermostatic water bath kept at 20° C. for 2 hours, viscosity of the syrup composition was measured with BM type viscometer of the type 1 in the Brookfield viscometer described in JIS K6901.

(2) Curing Time:

A syrup composition after a polymerization initiator and the like had been added was introduced into a test tube with an inside diameter of 10 mm (length of 12 cm) to a level of 7 cm from the bottom, and the test tube was placed again in a thermostatic water bath kept at 20° C., a thermocouple being set at the center part of the test tube, and temperature change induced by exothermic heat of polymerization was recorded.

A time taken from the addition of the polymerization initiator to the point where the maximum temperature was attained by the exothermic heat was defined as curing time (minutes).

The syrup composition having the curing time of 120 minutes or less is preferable in point of workability in the case of wet-on-wet coating and the one having the curing time of 60 minutes or less is more preferable.

(3) Odor Test:

In an environment controllable room (3 m×7 m×3 m in height) at a temperature of 23° C. and relative humidity of 50%, a substrate (a JIS mortar plate having the size of 30 cm×30 cm×6 cm in thickness) and a syrup composition were left to stand for 4 hours or more in order to let them adapt to the temperature of the environment controllable room, and then the syrup composition was coated on the surface of the substrate at an amount of about 0.5 kg/m$^2$ in the environment controllable room while 5 people attended during this coating operation and checked the odor at a position 50 cm apart from the coating film surface and evaluated the results as follows.

A: All of the 5 people did not smell.
B: Two of them slightly smelled.
C: All of the 5 people smelled.

(4) Property of Cured Material:

A syrup composition after a polymerization initiator and the like had been added and a degassing operation had been carried out was poured into a mold, and the resultant system was left to stand for 2 hours, and a cured material was taken out to obtain a cast plate of 3 mm in thickness. The cast plate was made into the dumbbell type No. 1 according to JIS K6251 to obtain a test piece. The property of the cured material with respect to the test piece was evaluated at 20° C. according to JIS K6251.

(5) Coloring (YI Value):

A syrup composition after a polymerization initiator and the like had been added was applied to a white ACRYLITE plate (manufactured by Mitsubishi Rayon Co., Ltd.) using an applicator so that thickness of a coating film might become 1 mm, and the syrup composition was cured at 20° C. After the syrup composition was cured, YI value of the cured material was measured according to JIS K7105 using a spectral color difference meter (trade name: SE-2000, manufactured by Nippon Denshoku Industries Co., Ltd.), and evaluation was carried out according to the following standard.

A: YI value was less than 20.
B: YI value was 20 to 30.
C: YI value was more than 30.

(6) Roller Coatability:

Evaluation of roller coatability was carried out for checking propriety of a syrup composition when the syrup composition is used for a prime layer (prime coating layer) and a topcoat layer (top coating layer).

The syrup composition after a polymerization initiator and the like had been added was applied to a JIS mortar plate (30 cm×30 cm×6 cm in thickness) using a wool roller so that thickness of a coating film might become 0.3 mm, and a coating workability was evaluated according to the following standard.

A: Excellent
C: Stringing or coating unevenness generated

Subsequently, when 1 hour passed after the syrup composition had been applied, surface curability of the coating film was checked by touch inspection and evaluated according to the following standard.

A: There was no tack.
C: There was a tack.

(7) Mortar Coatability:

Evaluation of mortar coatability was carried out for checking propriety of a resin mortar composition when the resin mortar composition is used for a mortar layer (intercoating layer).

The resin mortar composition was applied to a JIS mortar plate (30 cm×30 cm×6 cm in thickness) using a trowel so that thickness of a coating film might become 5 mm, and a coating workability was evaluated according to the following standard.

A: Excellent
C: Coating unevenness generated

Subsequently, when 1 hour passed after the resin mortar composition had been applied, surface curability of the coating film was checked by touch inspection and evaluated according to the following standard.

A: There was no tack.
C: There was a tack.

(8) Wax Dispersibility:

Evaluation of wax dispersibility was carried out for checking stability of a syrup composition when the syrup composition is stored.

To a plastic container having the outside diameter of 120 mm and the height of 245 mm, 2,000 g of a syrup composition right after produced was introduced, and left to stand for 30 days in an environment controllable room (3 m×7 m×3 m in height) at a temperature of 23° C. and relative humidity of 50%. After 30 days had passed, the resultant contents was sieved using a sieve with a 1 mm mesh opening, and a size of a residue on the sieve was checked and evaluated according to the following standard.

A: There was no residue on the sieve.
B: There was a residue, the size of which was less than 5 mm.
C: There was a residue, the residue included a residue having the size of 5 mm or more.

(9) Stability of Defoaming Agent:

Evaluation of stability of a defoaming agent was carried out for checking stability of the defoaming agent when the syrup composition is stored.

To a plastic container having the outside diameter of 120 mm and the height of 245 mm, 2,000 g of a syrup composition right after produced was introduced, and left to stand in an environment controllable room (3 m×7 m×3 m in height) at a temperature of 23° C. and relative humidity of 50%. After predetermined days had passed, existence of deposition of the defoaming agent (a band shape precipitate at an upper part of the container) was checked by visual inspection and evaluated according to the following standard.

The syrup composition S-8 was not evaluated because a defoaming agent was not compounded to it.

A: There was no deposition even after 30 days had passed.
B: There was a deposition after 7 to 30 days had passed.
C: There was a deposition after less than 7 days had passed.

INDUSTRIAL APPLICABILITY

The syrup composition of the present invention is useful for civil engineering and architecture such as coating of floor surfaces, wall surfaces, pavement surfaces of roads, and the like because the syrup composition can form a coating film having low odor, excellent surface curability, and little coloring.

What is claimed is:

1. A syrup composition comprising:
   a mixture of monomers (A), each having a molecular mass of 130 to 300 and one (meth)acryloyl group;
   a resin (C) which is soluble in the monomers (A) and has a glass transition temperature of 20 to 155° C.;
   a wax (D); and
   a tertiary amine (E),
   wherein the monomers (A) comprise a heterocyclic ring-containing (meth)acrylate (a1), an oligoethylene glycol monoalkyl ether (meth)acrylate (a2), and a hydroxyalkyl (meth)acrylate (a3) having a hydroxyalkyl group with 2 or 3 carbon atoms.

2. The syrup composition according to claim 1, wherein a YI value of a cured material is less than 20 when the syrup composition is applied so that a thickness of a coating film made of the syrup composition is 1 mm and the coating film is cured to be the cured material.

3. The syrup composition according to claim 1, wherein the syrup composition does not substantially comprise a polyvalent metal soap.

4. The syrup composition according to claim 1, wherein the monomers (A) further comprise an alkyl (meth)acrylate (a4) having a long-chain alkyl group with 4 to 15 carbon atoms.

5. The syrup composition according to claim 1, further comprising a monomer (B) having 2 or more (meth)acryloyl groups.

6. A resin mortar composition comprising: the syrup composition according to any one of claims 1 to 5, and an aggregate to be compounded with the syrup composition.

7. A method of coating, comprising: applying the syrup composition according to any one of claims 1 to 5 or the resin mortar composition containing the syrup composition and an aggregate to an application surface to form a coating film.

8. A method of coating, comprising:
   forming a prime coating layer by coating the syrup composition according to any one of claims 1 to 5 on an application surface;
   forming an intercoating layer by coating the resin mortar composition obtained by compounding an aggregate to the syrup composition according to any one of claims 1 to 5 on the prime coating layer; and
   forming a top coating layer by coating the syrup composition according to any one of claims 1 to 5 on the intercoating layer.

* * * * *